United States Patent
Lamberson, Jr.

(10) Patent No.: US 6,254,055 B1
(45) Date of Patent: Jul. 3, 2001

(54) FISHING ROD HOLDER INSERT

(76) Inventor: Frank H. Lamberson, Jr., 118 W. Jefferson, Waupun, WI (US) 53963

( * ) Notice: Subject to any disclaimer, the term of this patent is extended or adjusted under 35 U.S.C. 154(b) by 0 days.

(21) Appl. No.: 09/182,819

(22) Filed: Oct. 29, 1998

(51) Int. Cl.⁷ .................................................. A01K 97/10
(52) U.S. Cl. ........................... 248/538; 43/17; 43/21.2; 206/315.11; 206/373; 220/529
(58) Field of Search .......................... 248/512, 520, 248/110, 111, 538, 539, 523, 524, 528, 129; 220/528, 529, 554, 510, 512; 206/315.11, 373, 499; 43/21.2, 26; 211/70.8, 686, 85.21, 85.18

(56) References Cited

U.S. PATENT DOCUMENTS

| | | | |
|---|---|---|---|
| D. 328,775 | * | 8/1992 | Galante ............................... D22/126 |
| D. 372,125 | * | 7/1996 | Frazier ................................ D3/315 |
| 3,298,532 | * | 1/1967 | Wilcke . |
| 3,751,845 | * | 8/1973 | Van Leeuwen ........................ 43/56 |
| 4,071,175 | * | 1/1978 | Wagnon ................................ 224/36 |
| 4,366,641 | * | 1/1983 | Price et al. ........................ 43/54.5 R |
| 4,463,511 | * | 8/1984 | Copfer ................................ 43/21.2 |
| 4,635,390 | * | 1/1987 | Walters .............................. 43/21.2 |
| 4,813,173 | * | 3/1989 | Abbotoy ............................. 43/57.1 |
| 4,901,846 | * | 2/1990 | Lehman ............................. 206/1.8 |
| 5,271,520 | * | 12/1993 | McAfee .............................. 220/529 |
| 5,350,065 | * | 9/1994 | Darrey ............................... 206/373 |
| 5,678,348 | * | 10/1997 | Zielinski et al. ................... 43/26 |
| 5,836,446 | * | 11/1998 | Varnom .............................. 206/373 |
| 5,971,333 | * | 10/1999 | Fiedor ............................ 206/373 X |

* cited by examiner

Primary Examiner—Anita M. King
Assistant Examiner—Tan Le

(57) ABSTRACT

A fishing rod holder insert for holding fishing rods in a bucket, especially a five-gallon bucket. The fishing rod holder insert includes spaced apart top and bottom plates with a plurality of elongate rods extending between the top and bottom plates to connect the top and bottom plates together. The top and bottom plates each have a plurality of spaced apart cutouts along the outer perimeter of the respective plate. Each of the cutouts of the top plate is associated with a cutout of the bottom plate. The cutouts of each associated pair of cutouts of the top and bottom plates are aligned with one another.

10 Claims, 2 Drawing Sheets

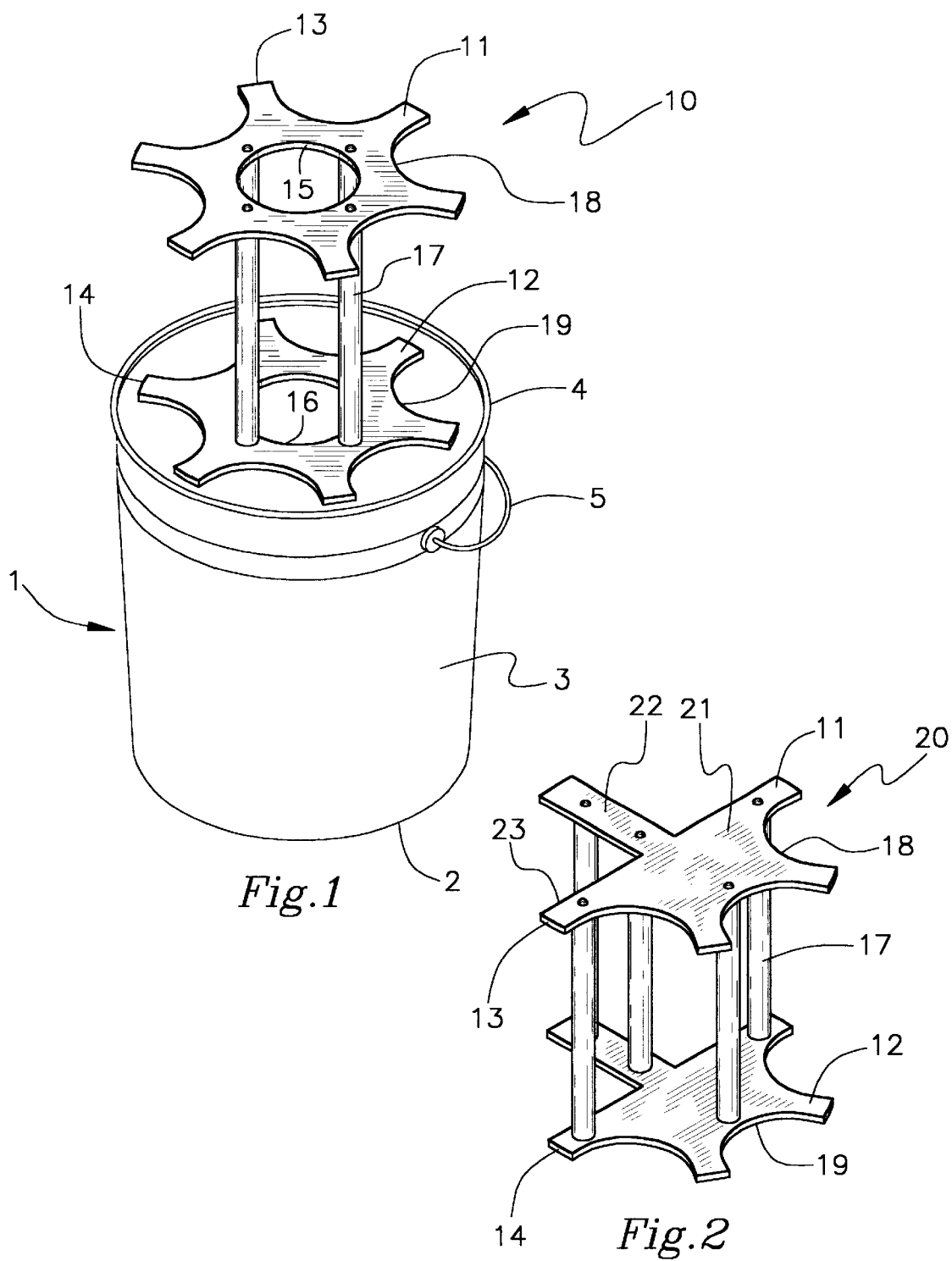

FISHING ROD HOLDER INSERT

BACKGROUND OF THE INVENTION

1. Field of the Invention

The present invention relates to fishing rod holders and more particularly pertains to a new fishing rod holder insert for holding fishing rods in a bucket, especially a five-gallon bucket.

2. Description of the Prior Art

The use of fishing rod holders is known in the prior art. More specifically, fishing rod holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,271,520; U.S. Pat. No. 3,751,845; U.S. Pat. No. Des. 328,775; U.S. Pat. No. Des. 372,125; U.S. Pat. No. 5,350,065; and U.S. Pat. No. 3,298,532.

While these devices fulfill their respective, particular objectives and requirements, the aforementioned patents do not disclose a new fishing rod holder insert. The inventive device includes spaced apart top and bottom plates with a plurality of elongate rods extending between the top and bottom plates to connect the top and bottom plates together. The top and bottom plates each have a plurality of spaced apart cutouts along the outer perimeter of the respective plate. Each of the cutouts of the top plate is associated with a cutout of the bottom plate. Each associated pair of cutouts of the top and bottom plates is aligned with one another.

In these respects, the fishing rod holder insert according to the present invention substantially departs from the conventional concepts and designs of the prior art, and in so doing provides an apparatus primarily developed for the purpose of holding fishing rods in a bucket, especially a five-gallon bucket.

SUMMARY OF THE INVENTION

In view of the foregoing disadvantages inherent in the known types of fishing rod holders now present in the prior art, the present invention provides a new fishing rod holder insert construction wherein the same can be utilized for holding fishing rods in a bucket, especially a five-gallon bucket.

The general purpose of the present invention, which will be described subsequently in greater detail, is to provide a new fishing rod holder insert apparatus and method which has many of the advantages of the fishing rod holders mentioned heretofore and many novel features that result in a new fishing rod holder insert which is not anticipated, rendered obvious, suggested, or even implied by any of the prior art fishing rod holders, either alone or in any combination thereof.

To attain this, the present invention generally comprises spaced apart top and bottom plates with a plurality of elongate rods extending between the top and bottom plates to connect the top and bottom plates together. The top and bottom plates each have a plurality of spaced apart cutouts along the outer perimeter of the respective plate. Each of the cutouts of the top plate is associated with a cutout of the bottom plate. Each associated pair of cutouts of the top and bottom plates is aligned with one another.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing rod holder insert apparatus and method which has many of the advantages of the fishing rod holders mentioned heretofore and many novel features that result in a new fishing rod holder insert which is not anticipated, rendered obvious, suggested, or even implied by any of the prior art fishing rod holders, either alone or in any combination thereof.

It is another object of the present invention to provide a new fishing rod holder insert which may be easily and efficiently manufactured and marketed.

It is a further object of the present invention to provide a new fishing rod holder insert which is of a durable and reliable construction.

An even further object of the present invention is to provide a new fishing rod holder insert which is susceptible of a low cost of manufacture with regard to both materials and labor, and which accordingly is then susceptible of low prices of sale to the consuming public, thereby making such fishing rod holder insert economically available to the buying public.

Still yet another object of the present invention is to provide a new fishing rod holder insert which provides in the apparatuses and methods of the prior art some of the advantages thereof, while simultaneously overcoming some of the disadvantages normally associated therewith.

Still another object of the present invention is to provide a new fishing rod holder insert for holding fishing rods in a bucket, especially a five-gallon bucket.

Yet another object of the present invention is to provide a new fishing rod holder insert which includes spaced apart top and bottom plates with a plurality of elongate rods extending between the top and bottom plates to connect the top and bottom plates together. The top and bottom plates each have a plurality of spaced apart cutouts along the outer perimeter of the respective plate. Each of the cutouts of the top plate is associated with a cutout of the bottom plate. Each associated pair of cutouts of the top and bottom plates is aligned with one another.

Still yet another object of the present invention is to provide a new fishing rod holder insert that is especially designed for holding tip-ups and jig poles typically used in ice-fishing in an organized manner in a bucket.

Even still another object of the present invention is to provide a new fishing rod holder insert that holds tip-ups and jig poles upright in a bucket so that they are held in position when ice-fishing. The fishing rod holder insert also helps prevent the lines of the tip-ups from becoming tangled with one another when ice-fishing These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new fishing rod holder insert removed from a bucket according to the present invention.

FIG. 2 is a schematic perspective view another preferred embodiment of the present invention.

DESCRIPTION OF THE PREFERRED EMBODIMENT

Figure 3:
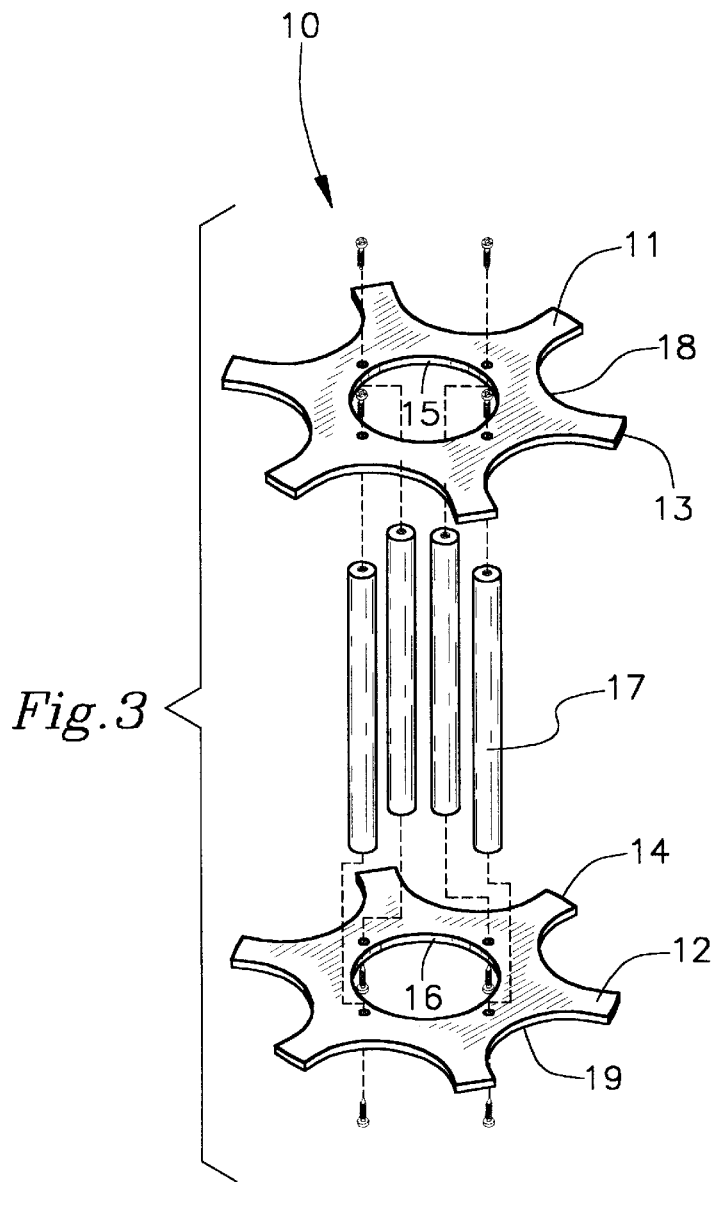
FIG. 3 is a schematic exploded perspective view of the present invention.
Figure 4:
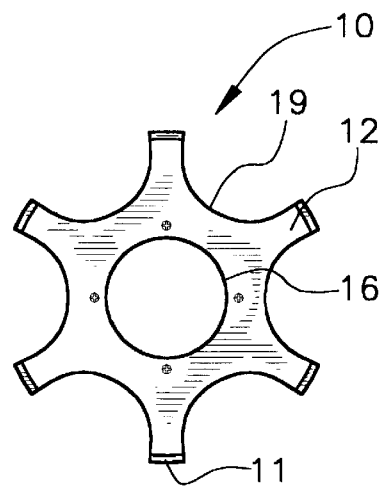
FIG. 4 is a schematic bottom view of the present invention.

With reference now to the drawings, and in particular to FIGS. 1 through 5 thereof, a new fishing rod holder insert embodying the principles and concepts of the present invention and generally designated by the reference numeral 10 will be described.

As best illustrated in FIGS. 1 through 5, the fishing rod holder insert 10 generally comprises spaced apart top and bottom plates 11,12 with a plurality of elongate rods 17 extending between the top and bottom plates to connect the top and bottom plates together. The top and bottom plates each have a plurality of spaced apart cutouts 18,19 along the outer perimeter of the respective plate. Each of the cutouts 18 of the top plate is associated with a cutout 19 of the bottom plate. The cutouts of each associated pair of cutouts of the top and bottom plates are aligned with one another.

In closer detail, the insert 10 is designed for use with a bucket 1 having a generally circular base wall 2 and a generally cylindrical perimeter side wall 3 upwardly extending around the base wall of the bucket. The perimeter side wall terminates at a generally circular upper edge 4. The perimeter side wall of the bucket also preferably has handle 5 pivotally coupled thereto. Ideally, the bucket is designed for holding about 5 gallons of a liquid therein.

The insert 10 is disposed in the bucket 1 and comprises spaced apart top and bottom plates 11,12. The top and bottom plates each have a center, an outer perimeter 13,14, and a generally circular central hole 15,16 therethrough. The bottom plate 12 is rested on the base wall of bucket and the top plate 11 is positioned adjacent the upper edge of the perimeter side wall of the bucket. Preferably, the outer perimeters of the top and bottom plate abut the perimeter side wall of the bucket completely around a circumference of the perimeter side wall of the bucket to help hold the insert stable in the bucket. The top plate and the upper edge of the perimeter side wall of the bucket preferably lie in generally parallel planes to one another. Also preferably the top and bottom plates lie in substantially parallel planes to one another. The top and bottom plates are also preferably generally coaxial with one another with the central holes of the top and bottom plates also generally coaxial with one another. In an ideal illustrative embodiment, the bottom plate has a diameter of at least about 10½ inches and the top plate has a diameter of about 11 inches.

A plurality of generally cylindrical elongate rods 17 are extended between the top and bottom plates to connect the top and bottom plates together. The rods are preferably extended substantially parallel to one another and substantially perpendicular to the top and bottom plates. The rods each have opposite top and bottom ends. The top ends of the rods are coupled to the top plate and the bottom ends of the rods are coupled to the bottom plate. In a preferred illustrative embodiment, each of the rods has a length defined between the top and bottom ends of the respective rod of about 9 inches. The rods are arranged around the peripheries of the central holes of the top and bottom plates ideally so that the rods are spaced apart at generally equal intervals around the peripheries of the holes of the top and bottom plates. Ideally, the plurality of rods comprises four rods to help ensure that the top plate is rigidly and strongly held in position in the bucket.

The top and bottom plates each have a plurality of spaced apart cutouts 18,19 along the outer perimeter of the respective plate. Each of the cutouts 18 of the top plate is associated with a corresponding cutout 19 of the bottom plate. The cutouts of each associated pair of cutouts of the top and bottom plates are aligned with one another along a line extending substantially parallel to the rods. The cutouts is spaced apart at generally equal intervals along the outer perimeter of the respective plate. In an ideal illustrative embodiment, the interval between cutouts is about 1¼ inches.

Each of the cutouts has a generally arcuate periphery has an outwardly facing concavity. In one preferred embodiment, the arcuate periphery of each of the cutouts of the top and bottom plates are of generally equal size and dimensions to one another. In one ideal embodiment, the arcuate periphery of each of the cutouts of the top and bottom plates is generally parabolic in shape. Optionally, the arcuate periphery of each of the cutouts of the top and bottom plates may be generally semi-circular in shape. Ideally, each of the cutouts of the top and bottom plates has a maximum depth defined along a radial line extending between the center and the outer perimeter of the respective plate of about 2¼ inches. In the ideal illustrative embodiment, each of the cutouts of the bottom plates has a maximum width defined at the ends of the respective cutout at the outer perimeter of the respective plate at least about 4 inches and the cutouts of the top plate each have a maximum width of about 4¼ inches.

In use, each of the cutouts is designed receiving a tip-up or a jig rod therein to hold the tip-up or jig rod relatively upright in the bucket. The central holes are also adapted for holding upright tip-ups, jig rods and other fishing accessories therein. Ideally, each of the plates has six cutouts to provide space for a optimal number of tip-ups and jig rods for a typical ice-fisherman and to properly space apart the tip-ups and jig rods so that their lines do not get easily tangled together.

Figure 5:
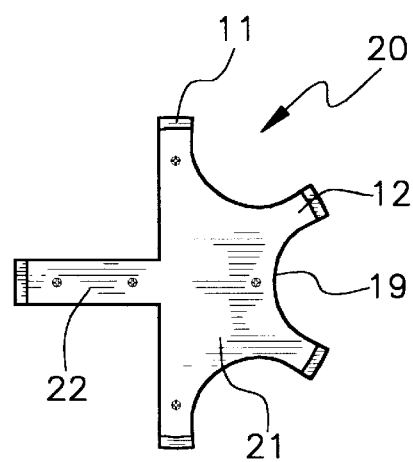
FIG. 5 is a schematic bottom view of the other preferred embodiment of the present invention.

In another preferred embodiment 20 illustrated in FIGS. 2 and 5, the top and bottom plates each have a generally semi-circular portion 21 and a generally rectangular portion 22 outwardly extending substantially perpendicularly from a generally straight side 23 of the semi-circular portion of the respective plate. The rectangular portion and the straight side of the semi-circular portion of the respective plate define a pair of right-angled spaces each designed for holding a jig box therein. In an illustrative ideal embodiment, the rectangular portion of the bottom plate has a length defined perpendicular to the associated straight side of at least about 4½ inches and the length of each rectangular portion of the top plate is about 4¾ inches. Ideally, the rectangular portion of each of the plates has a width defined parallel to the associated straight side of about 1½ inches. In the ideal illustrative embodiment, the rectangular portion of the bottom plate divides the associated straight side into a pair of segments each having a length of at least about 4½ inches and the rectangular portion of the top plate forms segments of about 4¾ inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insert for insertion into a bucket, comprising;

spaced apart top and bottom plates;

said top and bottom plates each having a center, and an outer perimeter;

a plurality of rods being extended between said top and bottom plates to connect said top and bottom plates together;

said top and bottom plates each having a plurality of spaced apart cutouts along said outer perimeter of the respective plate;

each of said cutouts of said top plate being associated with a cutout of said bottom plate, each associated pair of cutouts of said top and bottom plates being aligned with one another; and wherein said top and bottom plates each have a generally semi-circular portion and a generally rectangular portion outwardly extending substantially perpendicularly from a generally straight side of said semi-circular portion of the respective plate.

2. The insert of claim 1, wherein said top and bottom plates lie in substantially parallel planes with one another.

3. The insert of claim 1, wherein said centers of said top and bottom plates are generally coaxial with one another.

4. The insert of claim 1, wherein said rods are extended substantially parallel to one another and substantially perpendicular to said top and bottom plates.

5. The insert of claim 1, wherein each of said cutouts has a generally arcuate periphery having an outwardly facing concavity.

6. The insert of claim 5, wherein said arcuate periphery of each of said cutouts of said top and bottom plates is generally parabolic in shape.

7. The insert of claim 5, wherein said arcuate periphery of each of said cutouts of said top and bottom plates is generally semi-circular in shape.

8. The insert of claim 1, wherein said top and bottom plates each have a central hole, said central holes of said top and bottom plates being substantially coaxial with one another, said rods being arranged around said peripheries of said central holes of said top and bottom plates.

9. The insert of claim 8, wherein said rods are spaced apart at generally equal intervals around said peripheries of said holes of said top and bottom plates.

10. In combination:

a bucket having a generally circular base wall and a generally cylindrical perimeter side wall upwardly extending around said base wall of said bucket, said perimeter side wall terminating at a generally circular upper edge, said perimeter side wall of said bucket having handle pivotally coupled thereto;

an insert being disposed in said bucket, said insert comprising:

spaced apart top and bottom plates;

said top and bottom plates each having a center, an outer perimeter, and a generally circular central hole therethrough;

said bottom plate being rested on said base wall of bucket, said top plate being positioned adjacent said upper edge of said perimeter side wall of said bucket;

said outer perimeters of said top and bottom plate abutting said perimeter side wall of said bucket around a circumference of said perimeter side wall of said bucket;

said top plate and said upper edge of said perimeter side wall of said bucket lying in generally parallel planes to one another;

said top and bottom plates lying in substantially parallel planes with one another;

said top and bottom plates being generally coaxial with one another, said central holes of said top and bottom plates being generally coaxial with one another;

said central holes of said top and bottom plates each having a generally circular periphery;

a plurality of generally cylindrical elongate rods being extended between said top and bottom plates to connect said top and bottom plates together;

said rods being extended substantially parallel to one another and substantially perpendicular to said top and bottom plates;

said rods each having opposite top and bottom ends, said top ends of said rods being coupled to said top plate, said bottom ends of said rods being coupled to said bottom plate;

said rods being arranged around said peripheries of said central holes of said top and bottom plates, said rods being spaced apart at generally equal intervals around said peripheries of said holes of said top and bottom plates;

said top and bottom plates each having a plurality of spaced apart cutouts along said outer perimeter of the respective plate;

each of said cutouts of said top plate being associated with a cutout of said bottom plate, each associated pair of cutouts of said top and bottom plates being aligned with one another along a line extending substantially parallel to said rods;

each of said cutouts having a generally arcuate periphery having an outwardly facing concavity;

said cutouts being spaced apart at generally equal intervals along the outer perimeter of the respective plate wherein said arcuate periphery of each of said cutouts of said top and bottom plates are of generally equal size to one another;

wherein said arcuate periphery of each of said cutouts of said top and bottom plates is generally parabolic in shape; and wherein said top and bottom plates each have a generally semi-circular portion and a generally rectangular portion outwardly extending substantially perpendicularly from a generally straight side of said semi-circular portion of the respective plate.

\* \* \* \* \*